United States Statutory Invention Registration [19]

[11] Reg. Number: H974

Mizobuchi et al.

[43] Published: Nov. 5, 1991

[54] THRUST BEARING AND METHOD OF MANUFACTURING THEREOF

[76] Inventors: Shotaro Mizobuchi, 2-20-401 Satsuki-cho, Ebina-shi, Kanagawa-Ken; Katsumi Sasaki, 5-19-9, Haneda, Ota-ku, Tokyo; Yoshikazu Kimura, 4679-8, Kami-iida-cho, Yokohama-shi, Kanagawa-ken, all of Japan

[21] Appl. No.: 414,578

[22] Filed: Sep. 28, 1989

Related U.S. Application Data

[63] Continuation of Ser. No. 70,824, Jul. 6, 1987, abandoned, which is a continuation-in-part of Ser. No. 627,731, Jul. 3, 1984, abandoned.

[30] Foreign Application Priority Data

Jul. 6, 1983 [JP] Japan ..... 58-121567

[51] Int. Cl.[5] ..... B22F 3/24

[52] U.S. Cl. ..... 29/898.041; 29/898.13

[58] Field of Search ..... 29/898, 898.041, 898.13, 29/898.14, DIG. 36, 402.11; 51/310, 312, 295; 384/100, 112, 123, 124, 278, 305, 368, 369, 907.1; 501/103, 104; 156/89, 272.2

[56] References Cited

U.S. PATENT DOCUMENTS

| | | | |
|---|---|---|---|
| 3,295,263 | 1/1967 | Savoca et al. | 51/312 X |
| 3,439,962 | 7/1969 | Gothberg | 384/107 |
| 3,497,273 | 2/1970 | Muijderman et al. . | |
| 3,579,926 | 5/1971 | Gaspari | 51/312 X |
| 3,591,243 | 7/1971 | Kippenberg et al. | 384/907.1 X |
| 3,659,324 | 5/1972 | Murray | 29/898.041 X |
| 3,663,074 | 5/1972 | Fernlund . | |
| 3,883,314 | 5/1975 | Schnyder | 29/182.5 |
| 4,213,659 | 7/1980 | Tielemans et al. | 384/398 |
| 4,242,039 | 12/1980 | Villard et al. . | |
| 4,315,359 | 2/1982 | Gray | 384/100 X |
| 4,380,355 | 4/1983 | Beardmore | 384/123 |
| 4,410,285 | 10/1983 | Strasser et al. | 384/278 |
| 4,575,264 | 3/1986 | Mizobuchi et al. . | |
| 4,699,525 | 10/1987 | Mizobuchi et al. . | |

FOREIGN PATENT DOCUMENTS

| | | | |
|---|---|---|---|
| 2381199 | 9/1978 | France . | |
| 15121 | 1/1982 | Japan | 384/100 |
| 967517 | 8/1964 | United Kingdom | 29/898.041 |

OTHER PUBLICATIONS

"Spiral Groove Bearing-Compact and High Bearing Load", Seiho Yamamoto, Nikkei Mechanical 1979, 5-28.

"Grease-Lubricated Spiral-Groove Bearings", E. A. Muijderman et al., Philips Tech. Rev. 39, 184-198, 1980, No. 6/7.

"Design and Performance of Complaint Thrust Bearings with Spiral-Groove Members on Resilient Supports", L. Licht et al., Journal of Lubrication Technology, Jul. 1981, vol. 103/373.

"Dynamic Groove Bearing (Mass-Production, High Loading Capacity Precision in Rotating Accuracy)", Nikkei Mechanical, 1982, 5-24.

*Primary Examiner*—Michael J. Carone

[57] ABSTRACT

A thrust bearing having a spiral element and a flat element is provided wherein both elements are arranged so as to be rotatable relative to each other and the spiral element is made completely of ceramics in a disk form having a pattern of spiral grooves on the surface thereof that opposes the flat element. The spiral grooves are formed by a shot-blasting process applied through a resin mask having a spiral pattern, the depth of the grooves being kept within a range of between 3 μm and 50 μm and the ratio of the outer diameter of the spiral element to the thickness of the spiral element being arranged to be aout 10: at least 0.4 or over.

2 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THRUST BEARING AND METHOD OF MANUFACTURING THEREOF

This application is a continuation of now abandoned application Ser. No. 07/070,824, filed on July 6, 1987, which in turn is a continuation-in-part of application Ser. No. 06/627,731, filed July 3, 1984, now abandoned.

FIELD OF THE INVENTION

The present invention relates to thrust bearings and more particularly to thrust bearings employed in equipment adapted to be used underwater, such as submersible pumps or submersible motors and a method of making such thrust bearings.

BACKGROUND OF THE INVENTION

A thrust bearing such as one employed in a submersible pump or a submersible motor is usually subjected to a condition in which a thrust load imposed thereon increases when the motor or pump is put into operation. The value of the thrust may reach more than 1,000 kgf even in a small sized pump and, thus, such a thrust bearing is one of the portions to which great attention needs to be paid during the manufacture of these pumps.

A thrust bearing of a tilting pad type which involves precisely machined divided elements has previously been used in submersible equipment. In order to allow such a bearing to be used with an adequate lubricating effect, highly viscous lubricating liquid is required and, therefore, it has been necessary to encase and seal lubricating oil or the like within the bearing.

Accordingly, in the conventional thrust bearing of this type, there have been problems related to the sealing and cooling of the lubricating liquid. In addition, other problems concern the deterioration of the lubricating liquid, its low loading capacity and its low degree of reliability. Also, it cannot be used for hot liquids such as hot spring water or underground water at a temperature of 200° C. or more.

Spiral groove bearings have been known which are free from the drawbacks referred to above in connection with the thrust bearing of the tilting pad type.

Spiral groove bearings are described, for example, in U.S. Pat. No. 3,497,273 of E. A. Muijderman et al. E. A. Muijderman has played and continues to play a leading international role in the research on and development of spiral groove bearings.

In fact, the fundamental shape of the spiral groove bearing and the theoretical analysis thereof were established by Muijderman and his research group and announced not only by Muijderman et al. but also in a number of publications.

The shape of the spiral groove bearing has already been established, as well as the theory relating thereto. According to that theory, when, for example, a lubricating oil is used as an operating fluid in a spherical spiral groove bearing that is 100 mm in diameter, the bearing can withstand a load of about 100,000 kgf even when the bearing is rotated at a speed as low as 200 r.p.m. (see: Nikkei Mechanical, p 78–83, May 28, 1979).

However, the kind of equipment which currently utilizes such spiral groove bearings in fact includes VTRs, Video Disks, Magnetic Disks, Record Players, and Pumps having a low load capacity. All of these devices have a load capacity far lower than the extremely high load suggested in the above-mentioned theory.

Thus, although the spiral groove bearing has been theoretically established as having a high load capacity, the actual bearing capacity (load capacity) is far from that which is suggested by the theory, and no reasons have been given to explain why there is such a gap between theory and practice, or how it is possible to make theory coincide with practice in this respect.

Various devices have been proposed for improving the capacity and reliability of bearings. These improvements mainly concern: (a) reductions in starting resistance, (b) the shape of the groove, (c) countermeasures against the wear that occurs during starting and stopping, (d) reductions in end play in the axial direction and (e) methods of machining the groove. Item (e) is the main problem and it has thus far caused much concern. Methods such as etching, spark erosion, pressing and plating have been proposed, among which etching has been the one most recommended. Most of the proposals that utilized the etching method were concentrated in the period from 1973 to 1980.

During the development of such a technical trend, the following items have of late become important problems: (i) how to make a spiral groove bearing which has excellent antiwear capacity and which keeps its initial shape; (ii) how to improve the load carrying capacity of a spiral groove bearing; (iii) how to make a bearing which has sufficient load carrying capacity when lubricated with specific liquids (for example, water, sea water, corrosive liquids, high-temperature liquids fluids mixed with foreign matter, etc.); and (iv) how to obtain an accurately controlled groove shape.

Against this background, Japanese Laid-Open Patent No. 57-15121 of Tanaka et al. was proposed in 1982. Tanaka discloses solutions to several problems, namely how to control the shape of a groove, how to make the bearing element resistant to wear, and how to form a groove which satisfies the requirements for good shape. In the light of the development of bearings up to the date of his invention Tanaka starts from the standpoint of a known metal bearing, and proceeds by adding a ceramic coating as a way to increase the resistance to wear. In addition, Tanaka realizes that the thickness of this ceramic coating can serve as a means for accurately controlling the depth of the groove, and discloses the fact that this makes possible the use of shot-blasting, which essentially strips the ceramic coating from unmasked areas to form grooves in the coating which then serve as the grooves for the bearing.

Tanaka makes a statement that a bearing produced by the method disclosed displays a capacity close to its theoretical value, but this is because the Tanaka bearing is only used under a small load. When the load is increased, the Tanaka bearing will withstand neither the load itself nor repeated starting and stopping, both characteristics being essential in bearings of this type. In addition, such a coated bearing is not only more difficult to make, but is in fact more costly. In the first place, a ceramic coating cannot be applied directly to a smooth metallic surface. There are various techniques for applying a ceramic coating to the surface of a metallic material, but even where the metallic material surface is roughened, it is not possible to obtain a high degree of bonding strength. Further, the known methods of depositing the ceramic material, such as plasma deposition, result in a ceramic which is relatively porous.

Moreover, it has also been found that shot-blasting, which is believed to be the only practical way to roughen the surface in order to cause adherence of the ceramic, deforms the metallic disk so that the central portion of the surface which is shot-blasted is raised and the edges are depressed, i.e. in cross section the disk is slightly bowed. For this reason, it is difficult to make the thickness of the ceramic layer deposited thereon both flat on its outer surface and uniform in thickness. The tendency is for the ceramic layer to have a thin area at the center of the disk and a much thicker area around the edges after the free surface thereof has been lapped to make it smooth. This greatly reduces the ability to make the depth of any groove which is blasted in such a layer uniform in depth. Moreover, it is not always easy to accurately lap the ceramic layer such as to produce the desired thickness.

Further, the cost of the steps necessary to form the ceramic layer on the metallic surface together with the shotblasting and finishing steps cause the bearing to be costly.

SUMMARY OF THE INVENTION

Accordingly, there has been a need for a thrust bearing with a spiral grooved face which is free from the drawbacks referred to above.

Therefore, it is an object of the present invention to provide a thrust bearing with a spiral grooved face which has none of the drawbacks referred to above, which has a high load capacity and reliability, and which is far more durable and will withstand a far greater load than a coated bearing.

It is a further object of the present invention to provide a method for manufacturing such a thrust bearing with a spiral grooved face which overcomes the drawbacks of the prior art.

The above objects are accomplished by the present invention wherein at least one of the rotary and stationary elements of the thrust bearing is made completely of ceramic and the surface of the ceramic element facing and abutting against the other element is provided with a plurality of shallow spiral grooves. These spiral grooves are formed by placing a resin mask having a spiral pattern on the ceramic surface and using a shot-blast process on the surface through the resin mask. The remaining element which is adapted to oppose the ceramic element having the spiral grooves is made of materials which will not easily cause wear on the ceramic surface. For example, sintered bronze containing 10% carbon (by weight) or sintered hard metal is used. The depth of the spiral grooves formed on the ceramic element is preferably within the range of between 3 μm and 50 μm. If this depth is too small, such as smaller than 3 μm, even if dynamic fluid pressure should be produced thereby, worn particles generated by the frictional rotation may fill the grooves, thereby lowering the efficiency of the thrust bearing. On the other hand, if the depth of the spirals exceeds 50 μm, sufficient dynamic pressure may not be generated.

According to the present invention, when the ceramic element is in a disk form, the ratio of the outer diameter of the ceramic element to the thickness of the ceramic element should be about 10: at least 0.4. It has been found that shot-blasting, which is the only practical way to form the spiral grooves, deforms the ceramic element in the disk form so that the central portion of the surface which is shot-blasted is raised and the edges are depressed, i.e., in cross section the ceramic element is slightly bowed. The allowance for this deformation of the ceramic element in cross section should be within 0.5 μm in cases involving lubrication by air, within 1 μm in cases involving lubrication by water and within 2 μm in cases involving lubrication by oil, because, when hydrodynamic pressure is generated, the thickness of the fluid film formed between the rotary element and the stationary element is within the range of about 5 μm–10 μm in cases involving lubricants having low viscosity, such as air and water, and within the range of about 10 μm–20 μm in cases involving lubricants having a relatively high viscosity such as oil, and it has been found that the allowance for the deformation should be within 10 percent (%) of the thickness of the formed fluid film. It also has been found that the ratio referred to above has scarcely any relationship with the depth of the spiral grooves formed on the ceramic element or with the materials used for the ceramic element.

The present invention will be further clarified by the following description referring to the accompanying drawings, a brief description thereof being given below.

DETAILED DESCRIPTION OF THE PREFERRED EMBODIMENTS

Figure 1:
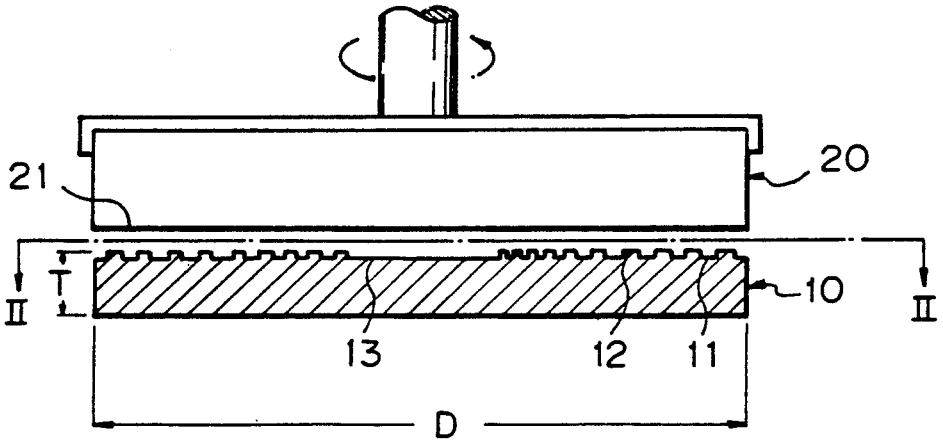
FIG. 1 is a schematic side view of the thrust bearing according to the present invention wherein one of the elements is shown in cross section.
Figure 2:
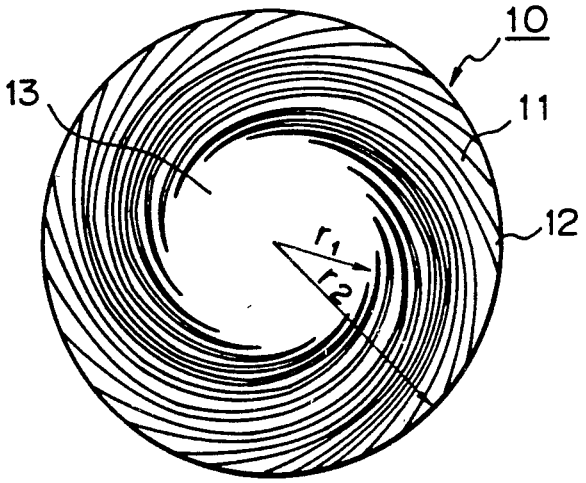
FIG. 2 is a plan view of a spiral element as viewed along the line II—II in FIG. 1.

Referring now to FIG. 1, a thrust bearing according to the present invention is illustrated which comprises a stationary element 10 and a rotary element 20. A plan view of the element 10 as seen along the line II—II is illustrated in FIG. 2. In this case, a plurality of spiral grooves 11 are formed on a flat surface of a stationary element 10. For convenience, the element 10 is referred to as a spiral element and the element 20 is referred to as a flat element. The spiral element 10 is made completely of ceramic in a disk form having a flat surface on the side that opposes the surface in which the spiral grooves 11 are formed. The flat element 20 is made of hard, wear-resistant metal in a disk form and its flat disk surface 21 is disposed coaxially with the element 10 so that the surface bearing the spiral grooves 11 and the flat surface 21 are kept in contact with each other due to the thrust pressure. FIG. 1 illustrates the fact that the flat element 20 is rotatable while the spiral element 10 is stationary. However, it is optional which of these is stationary and which is rotatable, provided that the relative rotation therebetween is arranged so that liquid introduced between the two elements is directed towards the center of the elements from their peripheral portions while generating dynamic pressure in the liquid. Further, the positional relationship with regard to which of the elements is disposed above the other is also optional.

On the spiral surface, a ridge or land 12 is left between the adjacent grooves 11. At the center portion of the spiral surface, a recessed circle area 13 is provided. The depth of the recessed area 13 from the top of the ridge may be equivalent to the depth of the grooves 11. However such a dimensional relationship is not a mandatory requirement. The depth of the grooves 11 is preferably arranged to be within a range between 3 μm and 50 μm for the reason explained hereinabove.

The ratio of the outer diameter D of the spiral element 10 to the thickness T of the spiral element 10 is arranged to be about 10: at least 0.4 for the reason explained hereinabove.

Now the method for producing the spiral grooves on the ceramic disk will be described. While ceramics have superior anti-corrosion and anti-wear characteristics, it is very difficult to work them. The shallow spiral grooves 11 are, thus, not easily produced on the surface of the ceramics. The inventors of the present invention have succeeded in forming the required spiral grooves on the surface of a disk by employing a shot-blasting process in association with the use of a resin or plastic mask placed over the ceramic surface.

That is, the ceramic disk having flat surfaces on both sides thereof and having the D:T ratio referred to above is prepared by sintering the ceramic to form the ceramic body and then finishing the flat surfaces thereof by lapping, and the surface of the ceramic disk is then covered by a plastic mask with a spiral pattern and minute particles of abrasive materials such as alumina ($Al_2O_3$) are directed onto the ceramic surface through the mask to form the spiral grooves on the surface within a relatively short time. A suitable size for the alumina is in the range of 25 μm–105 μm with respect to the mean grain diameter thereof.

The mask having a spiral pattern is made of plastic or resin which is photosensitive. Such a mask is prepared by the following steps. First, a negative film having a desired spiral pattern corresponding to, for example, that shown in FIG. 2 (or FIG. 8), is produced and placed on a glass plate over which a transparent cover sheet is placed. Over the cover sheet, a photosensitive resin or plastic is coated in a uniform thickness and over this is laminated a base film. Then the photosensitive layer of the plastic is exposed to ultraviolet rays for a few seconds to harden the exposed area of the photosensitive layer. Then the glass plate, the negative film and the cover sheet are removed and the unexposed portions of the resin are washed out chemically to produce a mask having a spiral pattern and supported on the laminated base file. The produced mask is temporarily covered with a protective paper on the side opposite the laminated base film until the mask is used. The mask may be subjected to a secondary exposure before applying the protective paper for storage purposes in order to further harden the spiral pattern.

In use, the protective paper is removed and the mask is adhered to the surface of the ceramic disk with the base film. Then the base film is removed and the shot-blasting process is applied to the surface through the mask. The base film is preferably of the double layered type comprising an auxiliary layer and a support layer so that the support layer can be removed while leaving the auxiliary layer on the mask. The auxiliary layer is thin and will not become a barrier to the shot-blasting process, since there is no substantial resistance in the auxiliary layer against the minute blasting particles injected. The plastic or resin used for making the mask in this method may be polyester, PVA etc.

Figure 3:
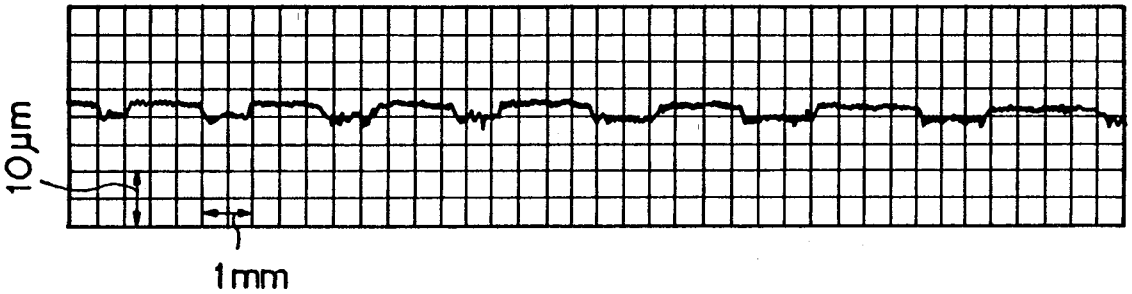
FIGS. 3 and 4 illustrate the dimensions of the grooves formed on the surface of the spiral element on an enlarged scale.
Figure 4:
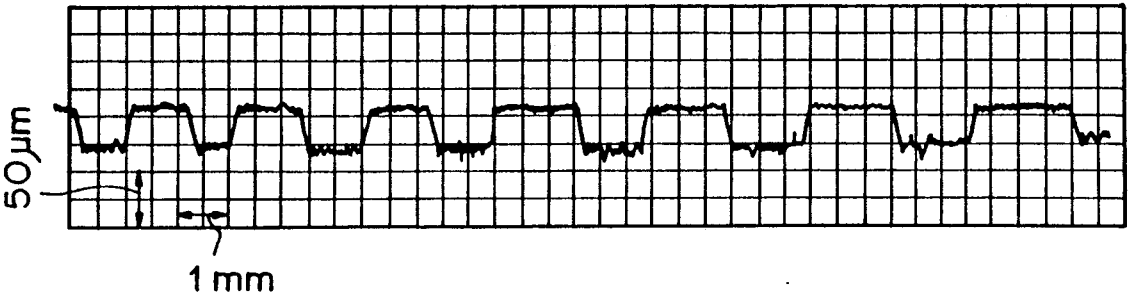

FIGS. 3 and 4 are examples showing the actual dimension of grooves obtained by the process according to the present invention. FIG. 3 shows the dimension produced by shot-blasting on the surface of sintered SiC ceramic having a specific gravity of 3.10 over which the mask is applied. The shot-blasting was performed with alumina particles under an air pressure of 4 kgf/cm$^2$ while keeping the blast nozzle a distance of 150 mm away from the surface. Approximately uniform grooves having a depth of about 5 μm were obtained by carrying out the operation for a period of 10 seconds. In FIG. 4, which is similar to FIG. 3, another result is shown in which the same process used for the grooves of FIG. 3 was applied, except that the operating period was 30 seconds. In this case, a mean groove depth of about 30 μm was obtained.

Figure 5:
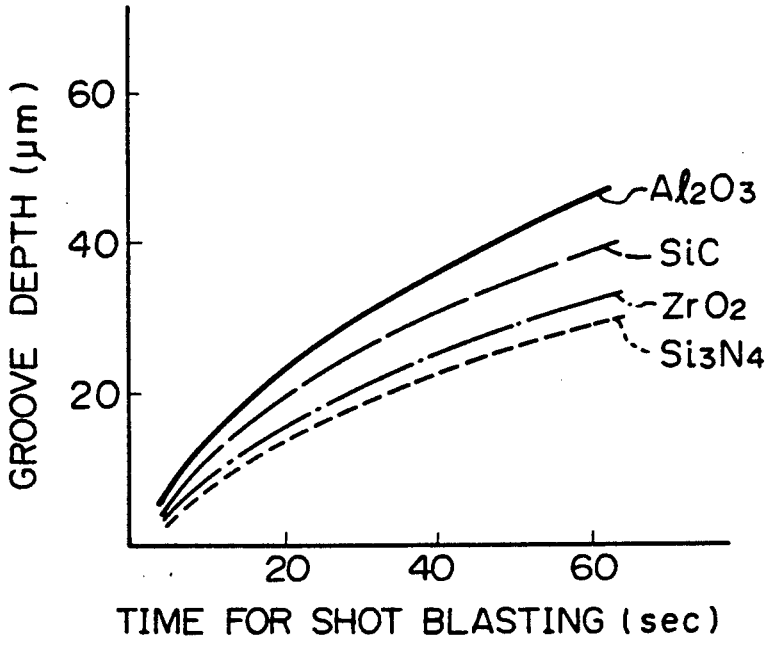
FIG. 5 shows the relationship between the groove depth and the processing time of the shot-blasting operation.

In FIG. 5, the relationship between the groove depth and the time of operating the shot-blasting is shown for the various ceramic materials appearing in this figure. As seen from the curves of FIG. 5, it is clear that a desired depth may be obtained by controlling the operating time.

In order to demonstrate and confirm the characteristic features of the thrust bearing produced according to the present invention, a series of tests was conducted.

Preparation of Test Materials (1) The inventors prepared a conventional thrust bearing having spiral grooves which were formed by coating the metal surface with a ceramic material and then subjecting the surface to shot-blasting, thereby stripping the coating layer.

The process employed was as follows:

(a) Machining of metal

Metal base materials (SUS420J2) which were 86 mm in diameter and 7 mm and 10 mm in thickness were made smooth by lapping their surfaces. The flatness of the front and back surfaces was 1 μm or less, and the maximum surface roughness was 0.5 μm or less.

(b) Surface treatment of metal base materials

The surfaces of the base materials were roughened by shot-blasting, because it was necessary to roughen the surface of the metal base plate in advance so as to coat a ceramic material on the surface of the metal base plate.

The specifications for the preliminary shot-blasting were as below:

| | |
|---|---|
| Particles: | Aluminum oxide ($Al_2O_3$) |
| Particle size: | 400 μm |
| Pneumatic pressure: | 5 kgf/cm$^2$ |
| Shot-blasting time: | 5 seconds |
| Distance between shotgun and base material: | 10 cm |

(c) Aluminum oxide coating

After shot-blasting, the surface of the base material was cleaned by air blowing( and aluminum oxide was coated thereon by plasma metallization.

The conditions for the plasma metallization coating were as below:

| | |
|---|---|
| Particle size of aluminum oxide: | 15 to 53 μm |
| Purity of aluminum oxide: | 99.6% or more (as aluminum oxide) |

-continued

| | |
|---|---|
| Metallizing gun: | METCO 7M plasma gun manufactured by METCO CO. in the U.S. |
| Voltage: | 65 V |
| Current: | 500 A |
| Thickness of the aluminum oxide coating: | 100 to 200 μm |

(d) Surface finishing and groove machining

The surface of the aluminum oxide coating layer was lapped with a diamond abrasive. The thickness of the layer was regularly measured, and the lapping was a stopped when the thickness of the layer at the center became 40 to 50 μm. Since the flatness of the surface of the layer in this state was 1 μm or less, and the surface was smooth, the surface of the layer was cleaned with trichloroethylene, a resin mask with a spiral groove pattern was attached, and then the surface of the layer with the attached spiral groove pattern was shot-blasted to form grooves.

The conditions for shot-blasting were as below:

| | |
|---|---|
| Particle | $Al_2O_3$ |
| Particle size: | approx. 105 μm |
| Pneumatic pressure: | 5 kgf/cm$^2$ |
| Shot-blasting time: | 50 seconds |

Samples E and F were obtained by this operation.

(2) Manufacture of the thrust bearings according to the present invention:

Aluminum oxide particles were sintered to obtain aluminum oxide sintered bodies having a diameter of 86 mm and thicknesses of 7 mm and 10 mm. The outer surfaces of the sintered bodies were lapped to mirror surfaces by diamond abrasive particles and the back surfaces of the sintered bodies were lapped smooth by diamond abrasive particles. Then, grooves were formed on the outer surface of the sintered bodies by shot-blasting in association with the use of the resin mask which was placed over the surface in the same manner as described in (1)-(d).

Samples G and H were obtained by this operations.

Test samples were thus obtained as shown in Table 1.

TABLE 1

| Sample No. | E | F | G | H |
|---|---|---|---|---|
| Diameter (mm) | 86 | 86 | 86 | 86 |
| Thickness (mm) | 10 | 7 | 10 | 7 |
| Base material | SUS420J2 | SUS420J2 | sintered $Al_2O_3$ | sintered $Al_2O_3$ |
| Coating material | aluminum oxide | aluminum oxide | none | none |
| Number of grooves | 15 | 15 | 15 | 15 |
| $r_1$ (mm) | 20 | 20 | 20 | 20 |
| $r_2$ (mm) | 43 | 43 | 43 | 43 |
| Depth of grooves (μm) | 30–56 | 50–96 | 26–31 | 40–64 |
| Average depth (μm) | 40 | 70 | 28 | 63 |
| Shot-blasting time (sec.) | 50 | 50 | 150 | 210 |

The samples E–H were used in the following comparative tests. The valves of the depths in Table 1 were obtained after the following comparative test.

Test Results

The performance tests were carried out in order to compare the bearings of the conventional ceramic coated type and the bearings according to the present invention with respect to:

(1) load carrying capacity; and (2) durability in the face of repeated starting and stopping operations.

(1) The critical load carrying capacity

Figure 6:
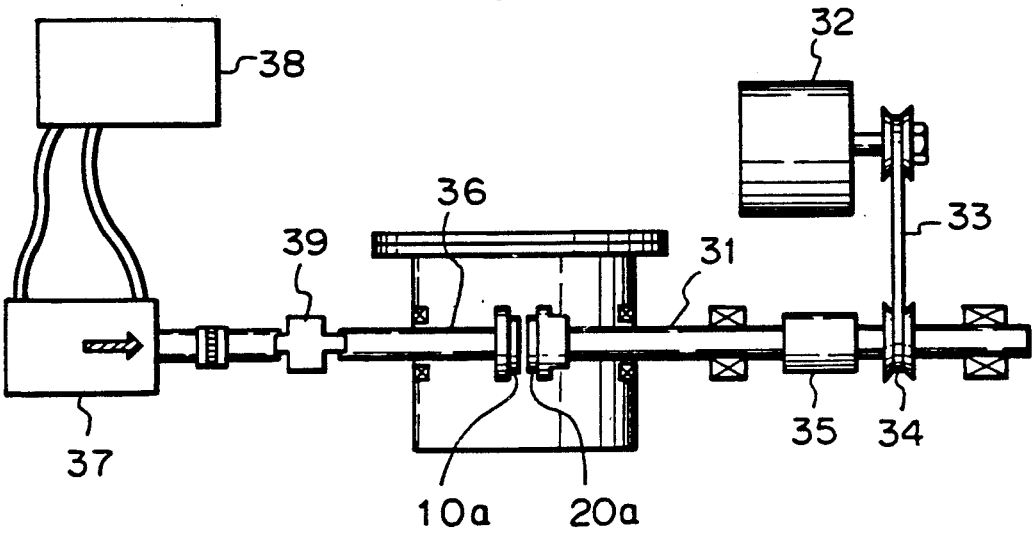
FIGS. 6 and 7 schematically illustrate testing equipment for evaluating the features of the thrust bearings.

FIG. 6 schematically illustrates testing equipment used to compare the thrust bearing according to the present invention with the conventional ceramic coated thrust bearing. 10*a* designates a stationary element of the thrust bearing and 20*a* designates a rotary element used in the test. A rotary shaft 31 supports the rotary element 20*a* and is driven by a variable speed motor 32 through a belt 33 trained around pulleys. The motor 32 can rotate at a speed of between 10 r.p.m. and 5000 r.p.m. On the shaft 31, a torque meter 35 is mounted. In opposed relation to the element 20*a* the stationary element 10*a* is disposed on a non-rotatable shaft 36. A hydraulic cylinder 37 (capable of applying maximum thrust of 10,000 kgf) is coupled to the shaft so as to impose a test load on the elements 10*a* and 20*a*. The hydraulic cylinder 37 is operated by a hydraulic pump 38. A load cell 39 is disposed between the cylinder 37 and the shaft 36 to measure the thrust load..

The test was conducted using the following method: the load was gradually increased while sliding at a constant rotational speed; the load carrying capacity when the frictional torque value reached 1.53 kgf.m was the critical loadcarrying capacity of the bearing.

The sample bearings tested were the bearing F (aluminum oxide coated metal) and the bearing H (sintered aluminum oxide). The ceramic bearings were pivotally supported and the sliding opposing materials were made of SUS420J2. The repetitive starting and stopping tests were conducted under the following conditions to obtain critical load carrying capacities, as shown in Table 2: water lubricant, rotational speed of 2000 r.p.m. and ambient temperature of water. Table 2 reveals that the capacity of the bearing H is no less than 3 times that of the bearing F. It is considered that the aluminum oxide coating layer of the bearing F is inferior in strength and thus inferior in load carrying capacity as compared with the bearing H.

TABLE 2

| Load Carrying Capacity | |
|---|---|
| Test bearing | Load carrying capacity |
| F | 224 kgf |
| H | 744 kgf |

(2) Repetitive starting and stopping test

Figure 7:
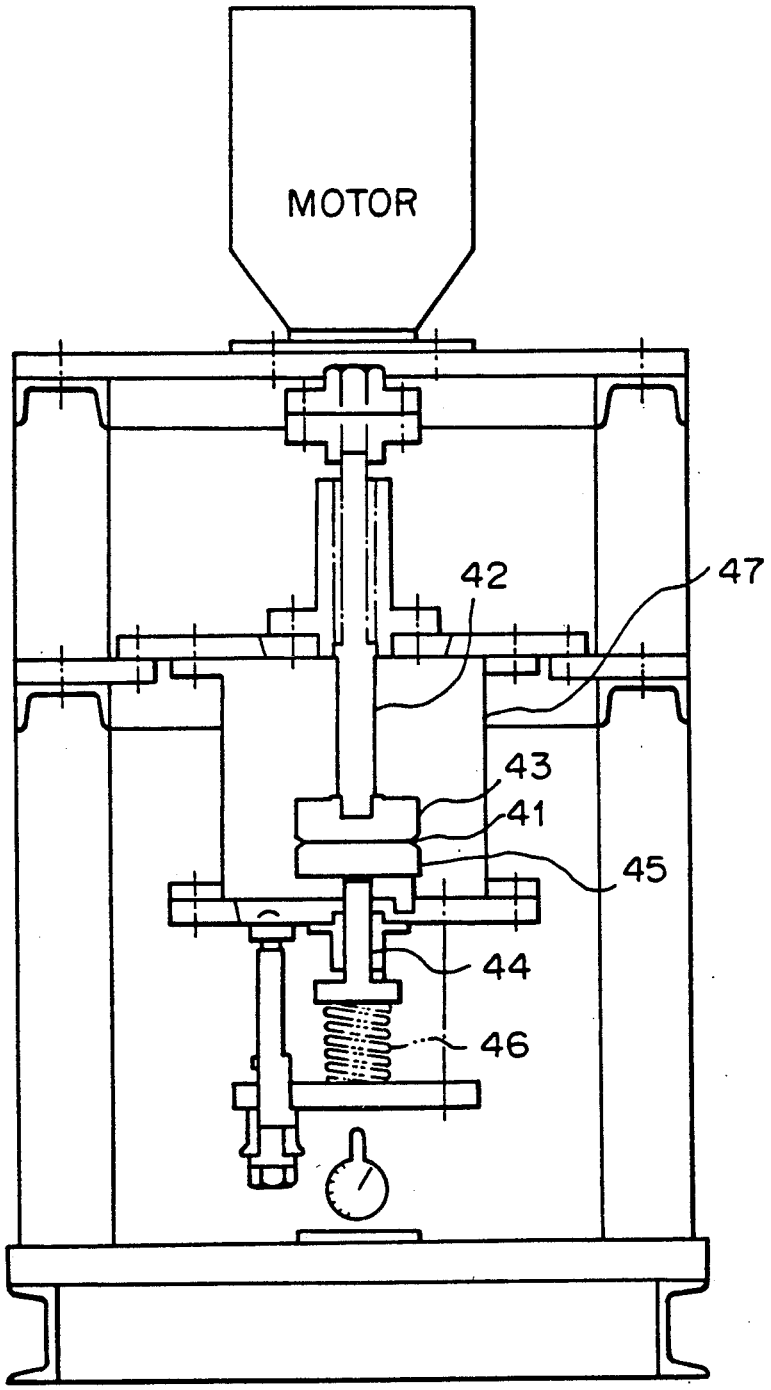

A sectional view of a repetitive starting and stopping testing machine is illustrated in FIG. 7. The test bearing 41 was disposed between an upper supporting plate 43 coupled directly to a drive shaft 42 and a lower supporting plate 45 connected by a spherical seat to a stator shaft 44 in a structure to which a constant load was applied by a load spring 46. A tank 47 was filled with a water lubricant, starting and stopping tests were repeated in a load-carrying state, and then the state of the bearing was examined.

The sample bearings tested were the bearing E (aluminum oxide coated metal) and the bearing G (sintered aluminum oxide). The ceramic bearings were pivotally supported and the sliding opposing materials were made of SUS420J2. The repetitive starting and stopping tests were conducted under the following conditions: water lubricant, rotational speed of 3000 r.p.m., ambient temperature of water and load of 184 kgf. The bearing surfaces were subjected 123 repetitions of the repetitive starting and stopping tests with 30-second periods of operation alternating with 2-minute periods of rest.

Bearing G suffered no observable damage, but bearing E experienced clearly observable damage. It was apparent that parts or all of the coating layer of the bearing E became exfoliated at several places.

Although improvements in anti-wear resistance were expected as a result of applying the ceramic coating on the surface of the base metal, damage actually resulted after only 123 repetitions of the repetitive starting and stopping tests under a load of 184 kgf, which was the weight of the rotary part at the start of the test.

The materials used for the thrust bearing according to the present invention may be selected from combinations other than those shown in Table 3, such as ($SiC$:$Si_3N_4$), ($Si_3N_4$:$Al_2O_3$) and ($ZrO_2$:$SiC$), etc.

TABLE 3

| Material of Bearing | |
|---|---|
| Spiral element | Flat element |
| sintered SiC | $Al_2O_3$ |
| sintered SiC | sintered bronze containing carbon |
| sintered SiC | sintered hard metal |

Now the configuration of the spiral is described. The spiral is selected in consideration of the fact that dynamic pressure is produced in the liquid introduced between the spiral and flat elements when relative rotation is caused therebetween.

Figure 8:
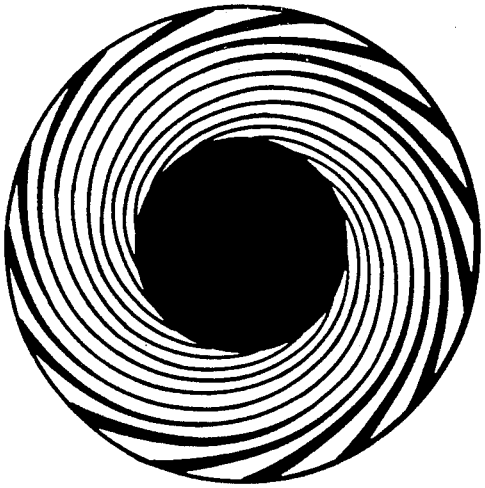
FIG. 8 is a photo of the pattern of the groves.

FIG. 8 shows an example of a spiral pattern actually used.

Figure 9:
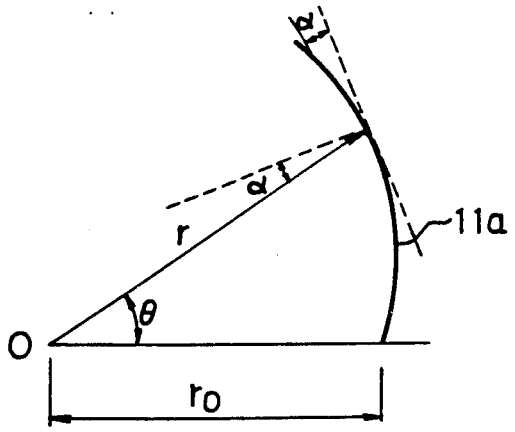
FIG. 9 illustrates an example of the spiral curves.

FIG. 9 shows an example of the spiral curve. In this case, the curve 11*a* corresponds to the polar equation of $$r = r_0 e^{\theta \tan \alpha}$$

wherein $r_0$: initial value of r when $\theta = 0$ $\theta$: angle of "r" relative to the initial $r_0$ $\alpha$: angle measured between r and a line normal to a tangent drawn from the curve at the point (r, $\theta$).

As noted above, the curve is not limited to that shown in FIG. 9 provided that dynamic pressure is generated upon relative rotation between the spiral element and the flat element.

It will be clear from the foregoing that the present invention provides many advantages over the prior art.

While the present invention has been explained in detail referring to the preferred embodiments, it should be understood that various modifications and changes are possible by those skilled in the art within the spirit and scope of the present invention which is defined in the claims annexed.

What is claimed is:

1. A method of manufacturing an element of a thrust bearing having spiral grooves thereon, comprising the steps of:

shaping and sintering a material to form a body which is entirely of sintered ceramic and in a disk form having flat surfaces on both sides thereof and having a ratio of the outer diameter of the sintered disk to the thickness of the sintered disk which is less than or equal to 25;

lapping at least one of said surfaces of said sintered ceramic disk;

preparing a mask having a pattern of spiral grooves;

placing said mask over said lapped surfaces of said sintered ceramic disk;

directing a stream of minute abrasive particles onto said lapped surface of said sintered ceramic disk through said mask for shot blasting spiral grooves in said lapped surface;

controlling the depth of said spiral grooves in said sintered ceramic disk to be a desired depth by operation of said shot blasting; and removing said mask from said lapped surface of said sintered ceramic disk;

whereby spiral grooves are formed on said lapped surface of said sintered complete ceramic disk.

2. A method as claimed in claim 1 wherein said material is selected from the group consisting of $Al_2O_3$, SiC, $ZrO_2$ and $Si_3N_4$.

* * * * *